Figure 1:
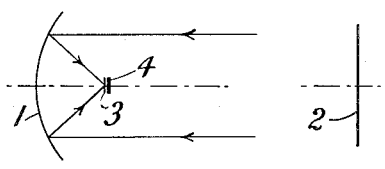

April 19, 1932.                B. E. LUBOSHEZ                1,855,112
PHOTOGRAPHIC APPARATUS
Filed June 7, 1928           3 Sheets-Sheet 1

Inventor:
Benjamin E. Luboshey
by Richard E. Babcock
Attorney

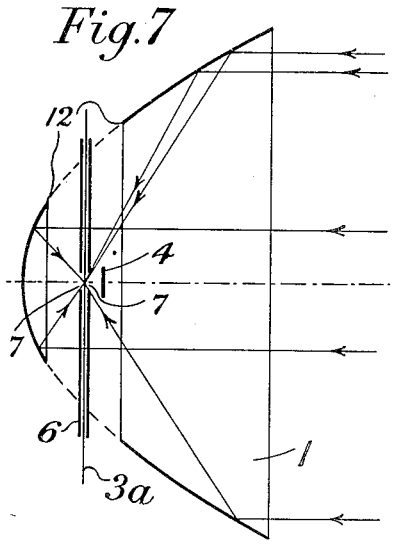
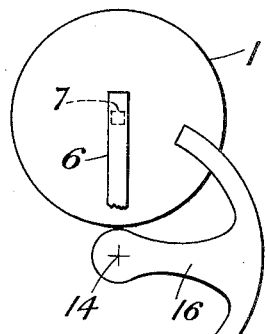
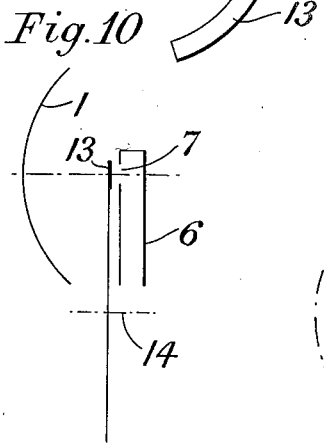
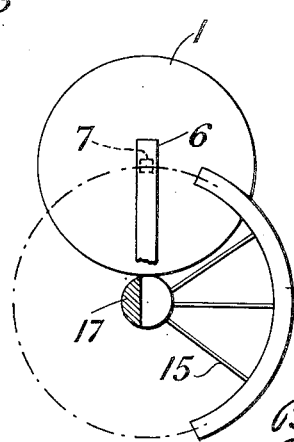
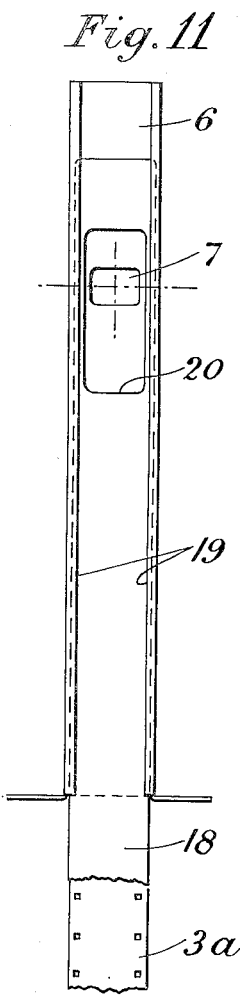

Patented Apr. 19, 1932

1,855,112

UNITED STATES PATENT OFFICE

BENJAMIN E. LUBOSHEZ, OF HARROW, ENGLAND

PHOTOGRAPHIC APPARATUS

Application filed June 7, 1928, Serial No. 283,616, and in Great Britain June 15, 1927.

The present invention relates to apparatus for taking photographs under difficult light conditions, for example instantaneous exposures upon X-ray fluorescent screens, and the object is to render the reflecting or concave mirror system of image-forming more practical than hitherto for extremely large apertures. The invention further consists in the improved form of camera for this purpose, and for taking cinematograph films of X-ray fluorescent screens. This purpose, wherein the exposure is made by means of the actinic light coming from the fluorescent substance, is to be clearly distinguished from radiography where the X-rays themselves affect the sensitive emulsion. In the present case, the X-rays are to be excluded.

Apart from the difficulties with refracting (lens) optical systems in obtaining a sufficiently large light-transmitting aperture, it is known that the reflecting system possesses the advantage of bringing all visible and actinic rays to the same sharp focus, i. e. chromatic aberration is entirely absent, a feature especially desirable in colour work, and of not absorbing the very short and highly actinic wave lengths in the ultraviolet region—light which has hitherto only been transmitted in appreciable amount through quartz lenses.

Now the problem that arises when any attempt is made to use a concave mirror for photographic image-forming is that of placing the sensitive emulsion in a position to receive the image without distorting it or unduly obstructing the incident light coming to the mirror, owing to the fact that the image formed by a single concave mirror is on the same side of the mirror as the object. Thus in attempting to use a concave mirror of very large "aperture", i. e. diameter with respect to its focal length, as a photographic objective, considerable distortion and blurring of the image takes place with the slightest deviation of the axis of the incident and reflected rays from the optical axis of the mirror. This deviation is essential if it is desired to place the sensitive emulsion clear of the incident rays to one side, and the deviation becomes the more considerable, and ultimately prohibitive, the shorter the focal length of the mirror with respect to its diameter.

In accordance with this invention, the incident and reflected rays and the mirror can all be co-axial, the appropriately shielded sensitive emulsion can be placed within the incident beam without undue light obstruction, and a mirror of much larger "aperture" than hitherto can be employed, by using only a very small central portion of the image and employing a correspondingly small plate or film.

Figure 2:
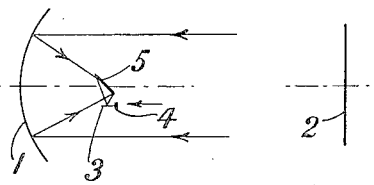
Figure 3:
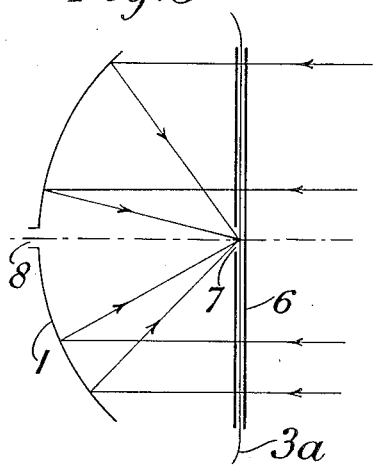
Figure 5:
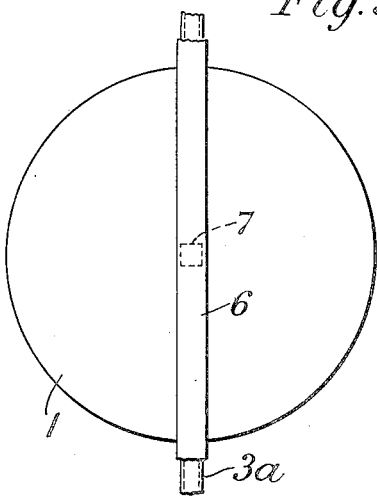
Figure 4:
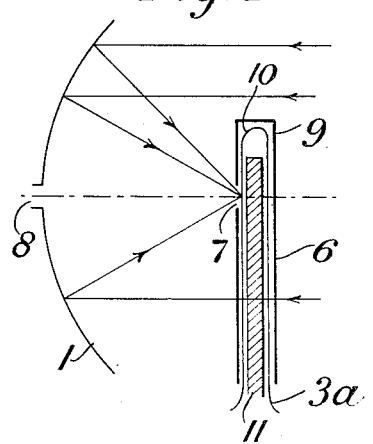
Figure 6:
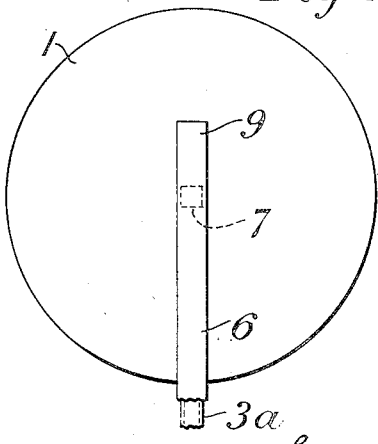
Figure 12:
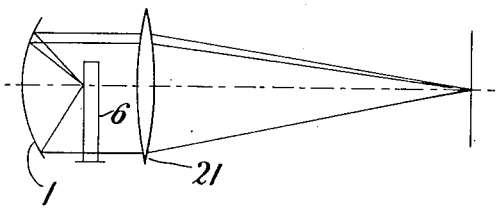
Figure 13:
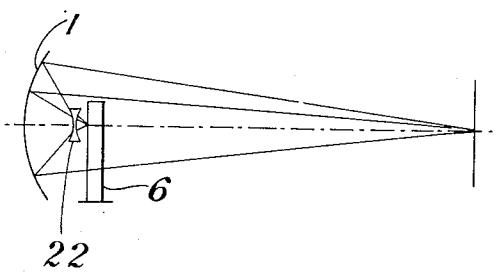
Figure 14:
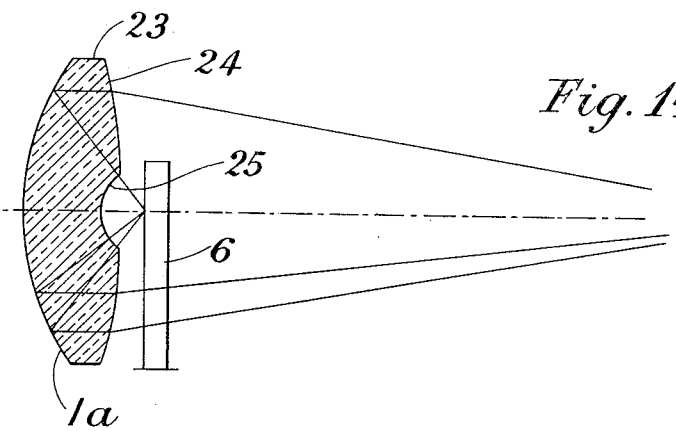

In the accompanying drawings, Figs. 1 and 2 are diagrams illustrating the invention in its simplest form, Figs. 3 and 4 are diagrams illustrating its application to cinematographic apparatus, Figs. 5 and 6 are axial views of Figs. 3 and 4 respectively, Fig. 7 illustrates a modification for extremely large apertures, Figs. 8–11 are diagrams of shutters, and Figs. 12–14 are diagrams illustrating methods of optical correction.

In Fig. 1, 1 represents a concave mirror forming an image of an object shown on the fluorescent screen 2 on a surface 3, the direction of the path of light being indicated by arrow heads. At the position 3 is arranged a very small area of photographic sensitive emulsion which is protected by a screen 4 from the direct light from the object 2. Where the object 2 is an X-ray fluorescent screen the actinic light from which is used to form the image and affect the emulsion, the screen 4 is of a substance impervious to X-rays, e. g. lead, in order to screen the emulsion from the direct rays which pass through the fluorescent screen 2, from the X-ray source. In this manner no light-transmitting X-ray-obstructing substance is necessary anywhere between 2 and 3. Hitherto with refracting optical systems lead glass or the like has been necessary for this purpose, and its omission enables any loss of light caused by it to be utilized to advantage. Owing to the extremely small size of the emulsion 3 and screen 4, only a very small portion of the beam incident to the mirror is obstructed, and the small central portion of the image thus utilized in the optical axial line reduces distortion due to aberrations in the mirror to a minimum.

Fig. 2 shows an arrangement where the emulsion 3 is placed edgewise to the incident beam, the screen 4 then requiring to be only wide enough to protect the edge of the emulsion. Owing to the possibility of thus placing the shielded emulsion within the incident beam and therefore quite close to the axis and the deflecting mirror 5, and owing also to the small portion of the image used, the mirror 5 may also be quite small and therefore offer little obstruction to the incident beam. It is to be understood, of course, that both these illustrations, as are the others also, are merely diagrammatic to shew the relative dispositions of features, and that the required supporting, holding, and other protecting means are provided for the emulsion 3, leaving exposed only that side turned towards the reflected beam.

Fig. 3 shows the application of the invention in its simplest form to cinematography. The film 3a is arranged to be fed by the usual mechanism through a closed channel 6 of rectangular cross section, the channel being provided with a window 7 facing the mirror 1 to expose that part of the film receiving an image. The channel 6 need be the only obstruction to the incident beam, and as will be seen by reference to the axial view Fig. 5, this represents only a small portion of the area of the mirror.

Fig. 3 also shews the provision made for focussing. An aperture 8 is provided in the centre of the mirror through which the image on the film is viewed direct, and the aperture may be provided with any form of eye-piece. Being in a portion of the mirror behind the channel 6, and therefore not being utilized, the viewing aperture does not deduct in any way from the useful area of the mirror. By this means it is also possible to view the image whilst the apparatus is in actual operation.

A method of still further reducing the obstruction of the incident light is shewn in Fig. 4. Here the film is led into and out of the channel 6 from the same side of the apparatus. In this case the film is fed continuously into the right hand side of the channel (as illustrated) and extracted from the left side intermittently by the usual mechanism. A space 9 at the end of the channel accommodates the loop of film 10 which occurs with continuous feed in the intervals of the intermittent motion. A division 11 within the channel separates and guides the ingoing and outgoing portions of the film as well as protecting the former from image light transmitted by the latter. Reference to the axial view Fig. 6 will again shew the possible prevention of obstruction of the incident beam.

In the case of parabolic mirrors where the diameter is extremely large compared with the focal length, the focal plane cuts through the mirror, i. e. the image would be within the space bounded by the mirror and a plane across its outer edge. In such circumstances it would only be possible to utilize the full diameter of the mirror by forming an image on both sides of the emulsion. Fig. 7 shews how this is done. There is a window 7 on both sides of the channel 6, and the window on the side facing the incident beam is shielded by a screen 4 placed a sufficient distance away to clear the reflected rays from the outer portion of the mirror. The channel 6 passes through the mirror, and as in fact reflected rays reaching the film at too acute an angle could not be utilized, the mirror may be interrupted or consist of two parts rigidly co-axially mounted but separated by a zonal space 12.

The screen 4 as in the case of Figs. 1 and 2, and the channel 6, at least on the side turned towards the incident beam, would be made of lead or the like when the apparatus was intended for taking cinematographic films of X-ray fluorescent screens.

In apparatus of the kind shewn in Fig. 7, a film having a sensitive emulsion on both sides may be used, or the light forming the image on one side may traverse the transparent film base in the case of the usual single emulsion films. In each case, of course, the two images are absolutely coincident.

Shutters suitable for use with all the arrangements shewn in Figs. 3–7 are shewn in Figs. 8–11. In Figs. 8 and 9 the shutter consists of a sector of an annulus 13 travelling in a circular path across and close to the window 7 about an axis 14 outside the incident beam and substantially parallel to the axis of the mirror. In Fig. 9 slender spokes 15 offering a minimum of light obstruction, e. g. placed edgewise to the light, are used to support the shutter, whilst in Fig. 8 the more substantial single support 16 is so shaped that it does not obstruct the incident light except when the shutter closes the window 7, when it does not matter. Appropriate counterbalancing 17 is provided. Fig. 10 is a side view of either Fig. 8 or Fig. 9.

In Fig. 11 the shutter takes the form of a reciprocating plate 18 running in guides 19 on the face of the channel 6, and provided with an aperture 20 adapted to uncover the window 7. This construction has the advantage of occupying less space, for a huge sweep is required for shutters as in Figs. 8 and 9 where the mirror is of large diameter.

A suitable form of camera for use with an objective of the kind described for taking photographs of an X-ray screen would be a long tube closed by the screen at one end and the mirror at the other. A tube of about 40 times the focal length of the mirror has been found convenient. This arrangement is deemed to be so obvious from description as not to need illustrating.

A concave mirror used as described as a photographic objective may be corrected for aberrations by means of one or more lenses or lens combinations. A concave mirror works best for an object at infinity and if parabolic would be perfect and need no correction. With objects which are close up, however, the incident beam is appreciably divergent, the more so the larger the "aperture" of the mirror. By placing a lens 21 as shewn in Fig. 12, such a divergent beam may be converted into a parallel beam, which would be the equivalent of light coming from an object at infinity. Fig. 13 shews how a concave lens 22 would be placed for corrective purposes. Fig. 14 shews an arrangement for use with objects at fixed close distances, as may very well be the case where the apparatus is used for a given X-ray screen. By its means almost perfect correction can be attained. Here the mirror is in the form of silvering or the like on one surface 1a of a bi-convex lens 23, the other surface 24 of which is of such curvature as will convert a given divergent beam into a parallel beam within the lens. The surface 24 is annular in form and bounds a concave central portion 25 where the rays reflected from the rear surface 1a emerge.

Still another method of correcting for aberrations of the mirror is to alter the shape of the object itself. For example, curvature of field may be corrected by a corresponding counteracting curvature of the surface of the X-ray screen.

I claim:—

1. In cinematographic apparatus comprising as an image-forming means a concave mirror having a focal point within the space bounded by the mirror and a plane across the outer edge thereof, a light-tight film guide of narrow width compared with the diameter of the mirror for conveying the film across the focal plane through apertures in the mirror, a window in each side of the guide to admit light to form coincident images on each side of the film, and a shield to obstruct direct light from the window facing the incident beam, placed far enough from the window to be clear of the image-forming reflected rays.

2. Cinematographic apparatus comprising in combination a concave mirror having two-spaced portions for focusing light rays in opposite directions to a common focal plane, a guide for conveying the film across said zonal space in said focal plane, a window in each side of the guide to admit reflected rays from the mirror to form coincident images on both sidies of the film, and a shield to obstruct direct light from the window facing the incident beam, said shield being placed far enough from the window to be clear of the image-forming reflected rays.

3. In photographic apparatus, a concave mirror having a focal point within the space bounded by the reflecting surface and a plane across the outer edge thereof, means for supporting within said space at said focual point a sensitive emulsion of narrow width compared with the diameter of the mirror, means for exposing one side of said emulsion to the rays coming from that zone of the mirror between the focal plane and its outer edge, means for exposing the other side of said emulsion to the rays coming from that zone of the mirror on the other side of its focal plane, and means for shielding the former side of the emulsion from direct light reaching the mirror.

In testimony whereof I have signed my name to this specification at London, this 29th day of May, 1928.

BENJAMIN E. LUBOSHEZ.